United States Patent [19]

Fleischer et al.

[11] Patent Number: 4,585,074
[45] Date of Patent: Apr. 29, 1986

[54] RIDGE FORMING APPARATUS

[75] Inventors: Mathew W. Fleischer; John C. David, both of Columbus, Nebr.

[73] Assignee: Fleischer Mfg., Inc., Columbus, Nebr.

[21] Appl. No.: 661,293

[22] Filed: Oct. 15, 1984

[51] Int. Cl.⁴ .................. A01B 39/14; A01B 39/20
[52] U.S. Cl. .................................. 172/194; 172/742; 172/748
[58] Field of Search .............. 172/194, 722, 723, 742, 172/724, 714, 195, 193, 709, 748

[56] References Cited

U.S. PATENT DOCUMENTS

| | | | |
|---|---|---|---|
| 27,956 | 4/1860 | Aikin | 172/748 |
| 642,398 | 1/1900 | Whitbeck | 172/722 X |
| 1,303,813 | 5/1919 | Brabandt | 172/194 |
| 1,606,799 | 11/1926 | Kassebeer | 172/709 X |
| 2,690,113 | 9/1954 | Altgelt | 172/748 X |
| 2,925,056 | 2/1960 | Wade | 172/194 X |
| 3,870,108 | 3/1975 | Orthman | 172/722 |

FOREIGN PATENT DOCUMENTS 2609568  1/1977  Fed. Rep. of Germany ...... 172/724
2735902 12/1978  Fed. Rep. of Germany ...... 172/709

Primary Examiner—Richard J. Johnson

Attorney, Agent, or Firm—Henderson & Sturm

[57] ABSTRACT

A ridge forming attachment for cultivators of a type having a plurality of earth working blades thereon for eliminating weeds between rows of crops growing in the field. The ridge forming attachment includes a bracket adapted to be attached to such cultivator rearwardly of one of the earth working blades thereon. A ridge forming wing structure is provided for moving the soil loosened by the earth working blades which it follows between the rows of crops and pushing such loose dirt to each side to form ridges along the rows of growing crops. The ridge forming structure is narrower at the front thereof and progressively tapers outwardly towards the rear of the space between rows for pushing the soil from such space between the rows outwardly towards the rows of growing crops. A connection structure is provided for operatively pivotally attaching the ridge forming structure to the bracket along a substantially vertical axis whereby the ridge forming structure will precisely track behind the earth working blades for permitting the ridge forming structure to be temporarily deflected from one side to the other in the event that rocks or other potentially damaging obstacles are encountered, and for tracking precisely behind such earth working blade even at those times when the row is not exactly straight.

5 Claims, 7 Drawing Figures

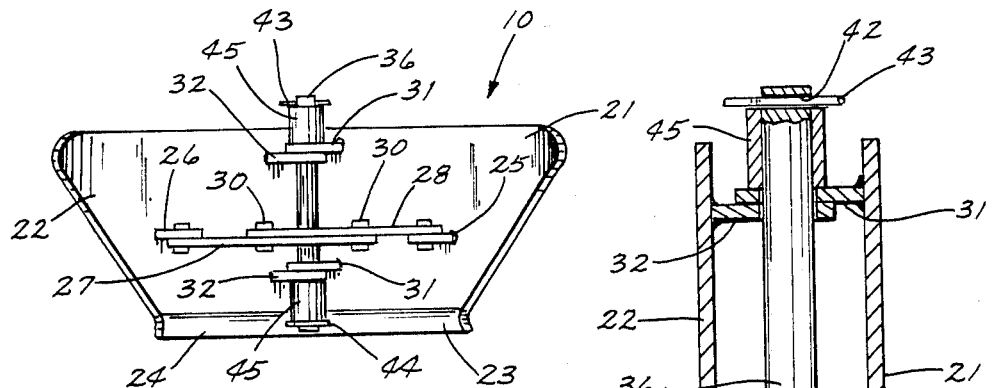
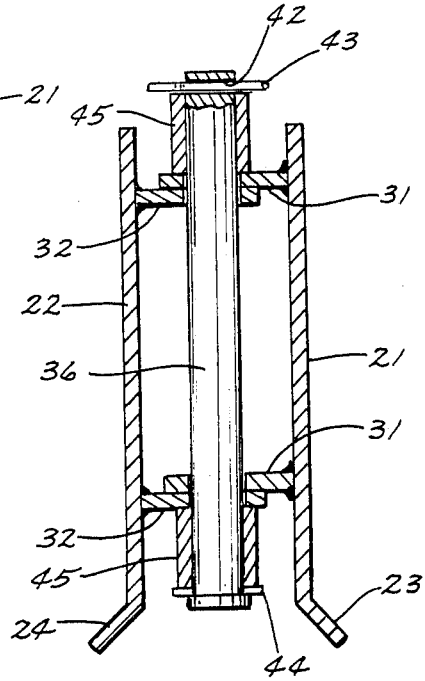
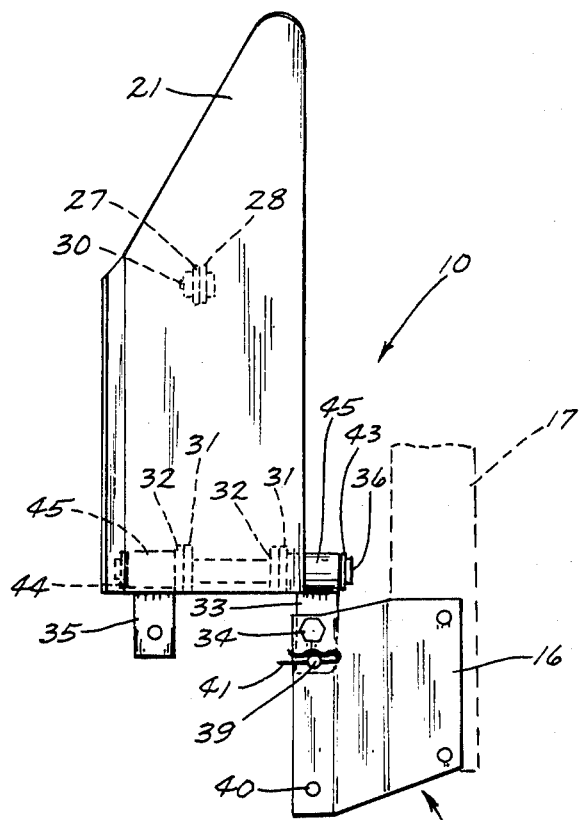

RIDGE FORMING APPARATUS

TECHNICAL FIELD

The present invention relates generally to cultivators and more particularly to an apparatus for attachment to a cultivator which is for the purpose of forming ridges in minimum tillage growing systems.

BACKGROUND ART

There has been a growing trend moving away from conventional tillage ideas in the growing of row crops and toward minimum tillage methods. This has been due in part to increases in labor, fuel and machinery costs and also because it has been determined that certain minimum tillage systems can reduce the aforementioned costs without reducing yields. In one such minimum tillage system, a ridge is formed and the row crop is planted in such ridge. The purpose of planting on a ridge is because during the winter, in a properly ridged field, trash and residue will fall off of the ridges and collect between the rows. The ridge remains high and clear, so, when spring comes, the ridge warms up first, while temperatures remain 10°-12° F. cooler under the cover of residue between the ridges. Consequently, the crop can be planted on the ridge much earlier than would be possible in cooler soil. Since the soil is not worked before the planting when using the aforementioned ridge type minimum tilling system, the moisture stays where it is needed. This is particularly important in dry years. Then, when a planter is used, it sweeps off the top of the ridge and makes a moist, mellow seed bed for quick germination and fast starts for the row crop.

Another advantage of using ridges in a minimum tillage system is for weed control. As a sweep is used to clean off the top of the ridge, residue and weed seeds are pushed into the valleys inbetween the rows where they are easily controlled, either by cultivation or with a herbicide.

Soil compaction is not a problem with a ridging system because the natural weathering process of freezing and thawing, wetting and drying, are constantly at work during the winter and spring loosening up the soil. The result is an ideal seed bed.

A further advantage of the system when the crop residues are left on the top, the organic matter therein breaks down much more rapidly into beneficial soil components. Additionally, the residue helps prevent wind and water erosion and reduce moisture loss in the soil due to evaporation. Also, the residue between the rows keeps the soil cooler, which means that the weed seeds that are between the rows get a slower start than the crops which are on the warmer ridges.

The prior art method of developing the aforementioned ridges for minimum tillage planting on such ridges is to use pairs of discs attached between the rows of cultivators. For example, a typical sweep for cutting weeds just below the soil would be followed up by such a set of discs which each have a pitch angle thereon whereby the fronts of such discs are close together and the rear portions of the discs are spaced further apart, and whereby each of the discs will gather dirt and throw such dirt outwardly, thereby forming a trench just behind such sweep and ridges to each side thereof, where the row crops are growing.

One of the problems with using pairs of discs to form the ridges is that a consistent ridge is difficult to form if the field has rocks or other obstacles therein which interfere with proper functioning of such discs systems. Another problem with discs systems is that they are substantially fixed, which is no problem if the rows are straight, but becomes a problem when the rows are not straight because if the sweep is disposed directly in the center of the row during a turn, then the ridge forming discs will be to one side or the other thereby forming a higher ridge on one side and a lower one on the other, or perhaps even cutting off some of the growing crops in the rows.

Consequently, there is a need for a ridge forming apparatus for attachment to cultivators which will overcome the aforementioned deficiencies in the prior art.

DISCLOSURE OF THE INVENTION

The present invention relates to a ridge forming attachment for cultivators of a type having a plurality of earth working blades thereon for eliminating weeds between rows of crops growing in the field. The ridge forming attachment is comprised of a bracket adapted to be attached to such cultivator rearwardly of one of the earth working blades thereon. A ridge forming wing structure is provided for moving the soil loosened by the earth working blades which it follows between the rows of crops and pushing such loose dirt to each side to form ridges along the rows of growing crops. The ridge forming structure is narrower at the front thereof and progressively tapers outwardly toward the rear of the space between rows for pushing the soil from such space between the rows outwardly towards rows of growing crops. A connection structure is provided for operatively pivotally attaching the ridge forming structure to the bracket along a substantially vertical axis whereby the ridge forming structure will precisely track behind the earth working blades for permitting the ridge forming structure to be temporarily deflected from one side to the other in the event that rocks or other potentially damaging obstacles are encountered, and for tracking precisely behind such earth working blade even at those times when the row is not exactly straight.

An object of the present invention is to provide an improved ridge forming attachment for cultivators.

Another object of the invention is to provide a ridge forming attachment of the aforementioned type which will accurately track behind an earth working tool on a cultivator.

Another object of the invention is to provide a ridge forming attachment for cultivators which will not be easily damaged by rocks or other potentially damaging obstacles in the soil.

Still another object of the invention is to provide a ridge forming attachment of the aforementioned type which is easily moved between an operative and an inoperative position.

Other objects, advantages and novel features of the present invention will become apparent from the following detailed description of the invention when considered in conjunction with the accompanying drawings.

BRIEF DESCRIPTION OF THE DRAWINGS

FIG. 5 is a rear view taken along line 5—5 of FIG. 4;

FIG. 6 is an enlarged cross-sectional view taken along line 6—6 of FIG. 4; and

FIG. 7 is a side elevational view like FIG. 4 but showing the ridge forming attachment in an inoperative position.

BEST MODE FOR CARRYING OUT THE INVENTION

Figure 1:
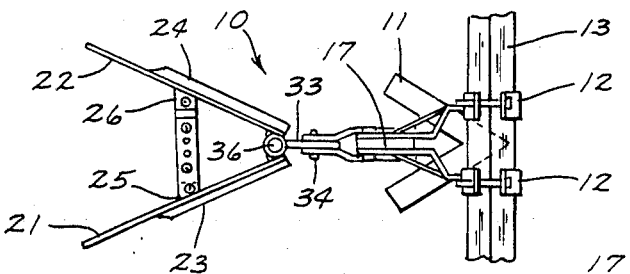
FIG. 1 is a top plan view showing a ridge forming attachment constructed in accordance with the present invention and attached to a portion of a cultivator.

Referring now to the drawings wherein like reference numerals designate identical or corresponding parts throughout the several views, FIG. 1 shows a ridge forming attachment (10) constructed in accordance with the present invention, and being attached to the rear portion of a sweep (11) which is, in turn, attached by brackets (12) to a tool bar (13).

Figure 3:
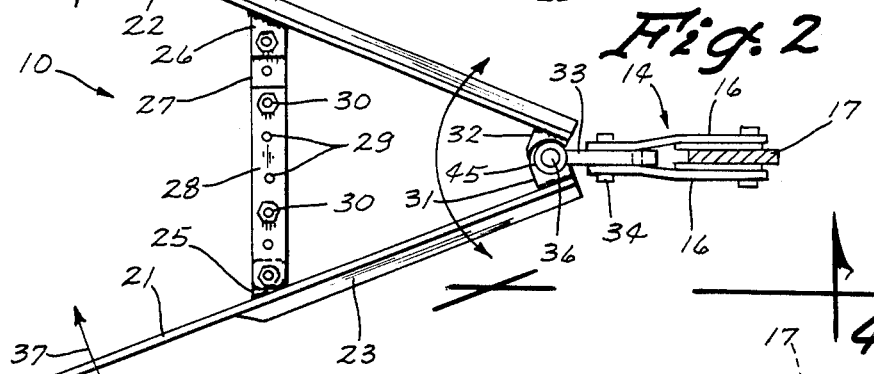
FIG. 3 is an enlarged top plan view of the present invention taken along line 3—3 of FIG. 2.

A bracket (14) is comprised of a pair of plates (16) which are bolted to a downwardly extending stem (17) of the sweep (11) by nut and bolt fasteners (18). The ridge forming attachment (10) includes a pair of plates (21) and (22) which are basically mirror images of one another and which have lower front edges (23) and (24), respectively, thereon for helping to push soil outwardly. Flanges (25) and (26) are respectively attached to intermediate portions of the plates (21) and (22), such as by welding, and link members (27) and (28), having a series of evenly spaced alignable openings (29) therein having nut and bolt fasteners (30) disposed through aligned ones of said openings (29). It will be readily understood from viewing FIGS. 3 and 5 that the distance between the rear and intermediate portions of plates (21) and (22) can be adjusted by the relative positions of linkages (27) and (28).

The front portion of the plate (21) has flanges (31) attached thereto and the front portion of the plate (22) has flanges (32) attached thereto. A connector (33) is bolted to the plates (16) of the bracket (14) by nut and bolt fastener (34).

A similar connection member (35) is pivotally attached to the lower portion of the plates (21) and (22) by a pin (36) which extends through an opening in connectors (33) and (35), and through flanges (31) and (32) which are welded to the plates (21) and (22), respectively. Consequently, it can be readily appreciated from viewing FIGS. 1-4, for example, that the plates (21) and (22), which are effectively rigidly connected together by means of linkages (27) and (28), can pivot about the vertical axis of pin (36) in the directions of arrows (37), to one side or the other of the center line (38).

Figure 2:
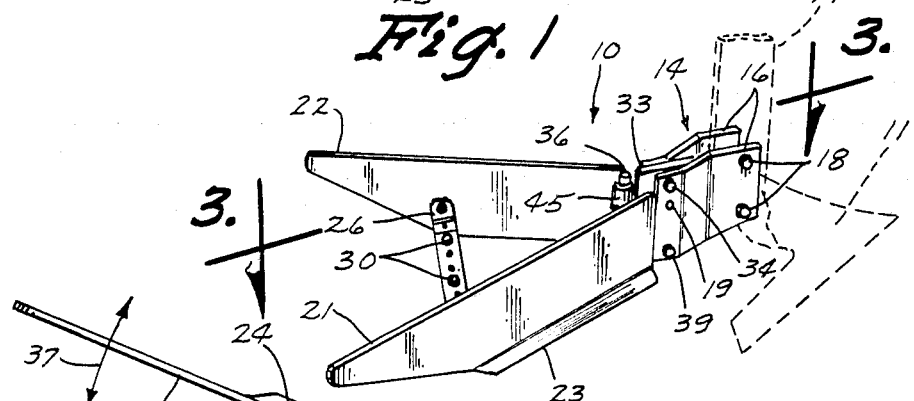
FIG. 2 is a perspective view of the ridge forming attachment shown in FIG. 1.
Figure 4:
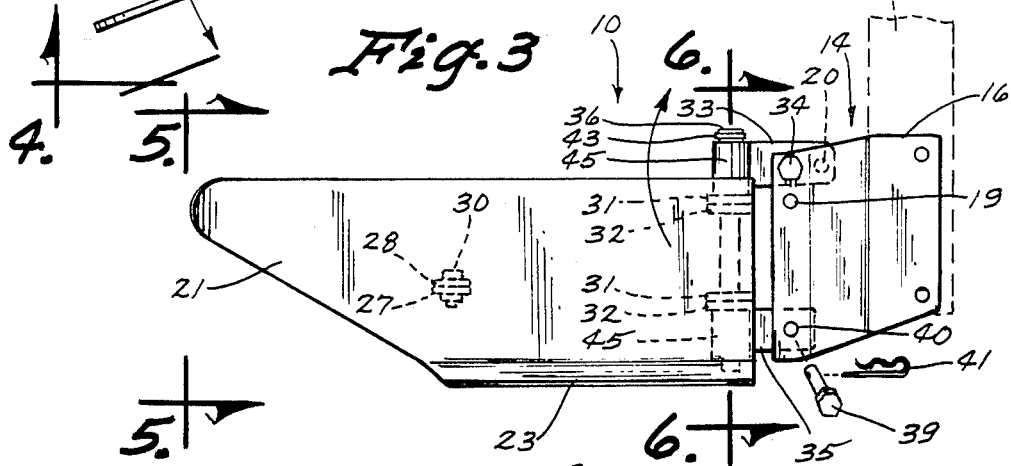
FIG. 4 is a side view taken along line 4—4 of FIG. 3.

A pin (39) is selectively disposed through an opening (40) in the bottom of the plates (16) and through an opening in the connector (35), for example as shown in FIGS. 2 and 4. A key (41) is selectively engageable through an opening in the end of the pin (39), for example as shown in FIG. 7.

In operation, the present invention is moved from the inoperative position shown in FIG. 7 wherein the key (41) is removed from pin (39) and the pin (39) is removed from the opening (19) in the plate (16) and from the opening (20) in the connection member (33). Then the ridge forming attachment (10) is pivoted about the bolt (34) downwardly to the position shown in FIGS. 1-4, whereby the pin (39) can be placed through the opening (40) in the plate (16) and through an aligned opening in the connection member (35). Consequently, a cultivator apparatus having a tool bar (13) with a plurality of sweeps (11) or other cultivating earth working members attached thereto can be utilized to pass through a field of row crops whereby the earth working sweep (11) will cut off weeds below the surface of the ground and loosen the soil; and then the ridge forming apparatus (10) will follow along behind and push the soil outwardly from the center line (38) between such rows of row crops, thereby causing ridges to be formed along the growing row crops. If it should happen that the rows are not straight, then the plates (21) and (22) will still automatically pivot to follow the earth working sweep (11). Similarly, if a rock or other hard obstacle is encountered by the plates (21) and (22) of the ridge forming attachment (10), then the plates (21) and (22) will pivot in the direction of arrows (37) in one direction or the other to temporarily deflect away from the obstacle rather than damaging the plates (21) and (22). Then, after such obstacle has been encountered, the plates (21) and (22) will be automatically aligned again behind the earth working machine (11).

Referring to FIGS. 5 and 6, it will be noted that bearings (45) can easily be changed by removal of keys (43) and (44) from pin (36), thereby permitting pin (36) to be removed from flanges (31) and (32).

Accordingly, it will be appreciated that the preferred embodiment disclosed above does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. A ridge forming attachment for a cultivator having a plurality of earth working blades thereon for eliminating weeds from between rows of crops growing in a field, said ridge forming attachment comprising:

a bracket adapted to be attached to such cultivator rearwardly of one of the earth working blades;

ridge forming means for moving soil loosened by said one earth working blade from between rows to each side thereof thereby causing ridges to be formed along the rows of growing crops, said ridge forming means being narrower at the front thereof and progressively diverging outwardly toward the rear thereof for pushing the soil from the center space between rows outwardly toward the rows of growing crops;

connection means for operatively pivotally attaching said ridge forming means to said bracket along a substantially vertical axis whereby said ridge forming means will precisely track behind said earth working blade and for permitting said ridge forming means to be temporarily deflected to one side or the other in the event that rocks or other potentially damaging obstacles are encountered;

pivot means for selectively permitting said ridge forming means to be pivoted to an inoperative position, said pivot means being operatively connected to said bracket and to said connection means for selectively pivoting said ridge forming means about a substantially horizontal axis between a lowered operative position and a raised inoperative position;

means for locking said ridge forming means into said operative position; and means for operatively locking said ridge forming means into said raised inoperative position.

2. A ridge forming attachment for a cultivator having a plurality of earth working blades thereon for eliminating weeds from between rows of crops growing in a field, said ridge forming attachment comprising:

a bracket adapted to be attached to such cultivator rearwardly of one of the earth working blades;

ridge forming means for moving soil loosened by said one earth working blade from between rows to each side thereof thereby causing ridges to be formed along the rows of growing crops, said ridge forming means being narrower at the front thereof and progressively diverging outwardly toward the rear thereof for pushing the soil from the center space between rows outwardly toward the rows of growing crops, said ridge forming means comprises a first plate lying in a substantially vertical plane pivotally attached to said bracket along said substantially vertical axis, a second plate lying in a second substantially vertical plane and pivotally attached to said bracket along said substantially vertical axis, and spacing means attached to said first and second plates rearwardly of said substantially vertical axis for holding the rear portion of said first and second plates apart;

connection means for operatively pivotally attaching said ridge forming means to said bracket along a substantially vertical axis whereby said ridge forming means will precisely track behind said earth working blade and for permitting said ridge forming means to be temporarily deflected in a horizontal plane to one side or the other in the event that rocks or other potentially damaging obstacles are encountered;

pivot means for selectively permitting said ridge forming means to be pivoted to an inoperative position, said pivot means being operatively connected to said bracket and to said connection means for selectively pivoting said ridge forming means about a substantially horizontal axis between a lowered operative position and a raised inoperative position; and means attached to said connection means for selectively locking said ridge forming means into said operative position for substantially limiting movement of said ridge forming means to movement in said horizontal plane.

3. The ridge forming attachment of claim 2 including adjusting means for selectively adjusting the width of the rear portion of said ridge forming means whereby various crop row width ridging operations can be accomodated by proper adjustment of said adjusting means.

4. The ridge forming attachment of claim 2 wherein a bottom forward edge of each of said first and second plates are bent outwardly.

5. The ridge forming attachment of claim 2 wherein said spacing means comprises rigid links having a plurality of holes therein and fastener means for extending through aligned ones of said holes in said links whereby the effective distance between the rear portions of said plates can be effectively adjusted.

* * * * *